(No Model.) 5 Sheets—Sheet 1.

S. D. LOCKE, Dec'd.
E. J. LOCKE & S. D. LOCKE, JR., Administrators.
MACHINE FOR MAKING CHAIN LINKS.

No. 580,579. Patented Apr. 13, 1897.

WITNESSES:
Chas. H. Platts
C. A. Cherry

INVENTOR
SYLVANUS D. LOCKE
BY Hindin Parsons,
ATTORNEY.

(No Model.) 5 Sheets—Sheet 4.

S. D. LOCKE, Dec'd.
E. J. LOCKE & S. D. LOCKE, JR., Administrators.
MACHINE FOR MAKING CHAIN LINKS.

No. 580,579. Patented Apr. 13, 1897.

WITNESSES:
Chas H. Platto
C. A. Cheney

INVENTOR
SYLVANUS D. LOCKE
BY Hundill Parsons,
ATTORNEY.

(No Model.)  5 Sheets—Sheet 5.

S. D. LOCKE, Dec'd.
E. J. LOCKE & S. D. LOCKE, JR., Administrators.
MACHINE FOR MAKING CHAIN LINKS.

No. 580,579. Patented Apr. 13, 1897.

WITNESSES:
Chas. H. Platto.
C. A. Cheney

INVENTOR
SYLVANUS D. LOCKE.
BY Hinsdill Parsons,
ATTORNEY.

UNITED STATES PATENT OFFICE.

SYLVANUS D. LOCKE, OF HOOSICK FALLS, NEW YORK; ELLEN J. LOCKE, ADMINISTRATRIX, AND SYLVANUS D. LOCKE, JR., ADMINISTRATOR, OF SAID SYLVANUS D. LOCKE, DECEASED.

MACHINE FOR MAKING CHAIN-LINKS.

SPECIFICATION forming part of Letters Patent No. 580,579, dated April 13, 1897.

Application filed March 11, 1892. Serial No. 424,604. (No model.)

*To all whom it may concern:*

Be it known that I, SYLVANUS D. LOCKE, a citizen of the United States, residing at Hoosick Falls, county of Rensselaer, and State of New York, have invented a new and useful Machine for Making Chain-Links from Sheet Metal, of which the following is a full, clear, and accurate description, reference being had to the accompanying drawings, forming part of this specification.

My invention relates more particularly to machines for making chain-links for which Letters Patent No. 393,992 of the United States were issued to me the 4th day of December, 1888, and the present application relates to the devices for making such links, such devices being adapted to carry out in a practical manner the method or process for the formation of such links, for which process an application for patent is pending concurrently herewith.

The present invention will be more fully hereinafter described, and pointed out in the claims.

Referring to the accompanying drawings, in which similar letters of reference indicate like parts, Figure 1 is a front elevation of a machine embodying my invention. Fig. 1$^a$ is a section showing the cams and cranks for operating the upper dies and the feeding mechanism. Fig. 3 is a longitudinal vertical section of the straightening and feed devices.

Figures 1, 1A, 3:
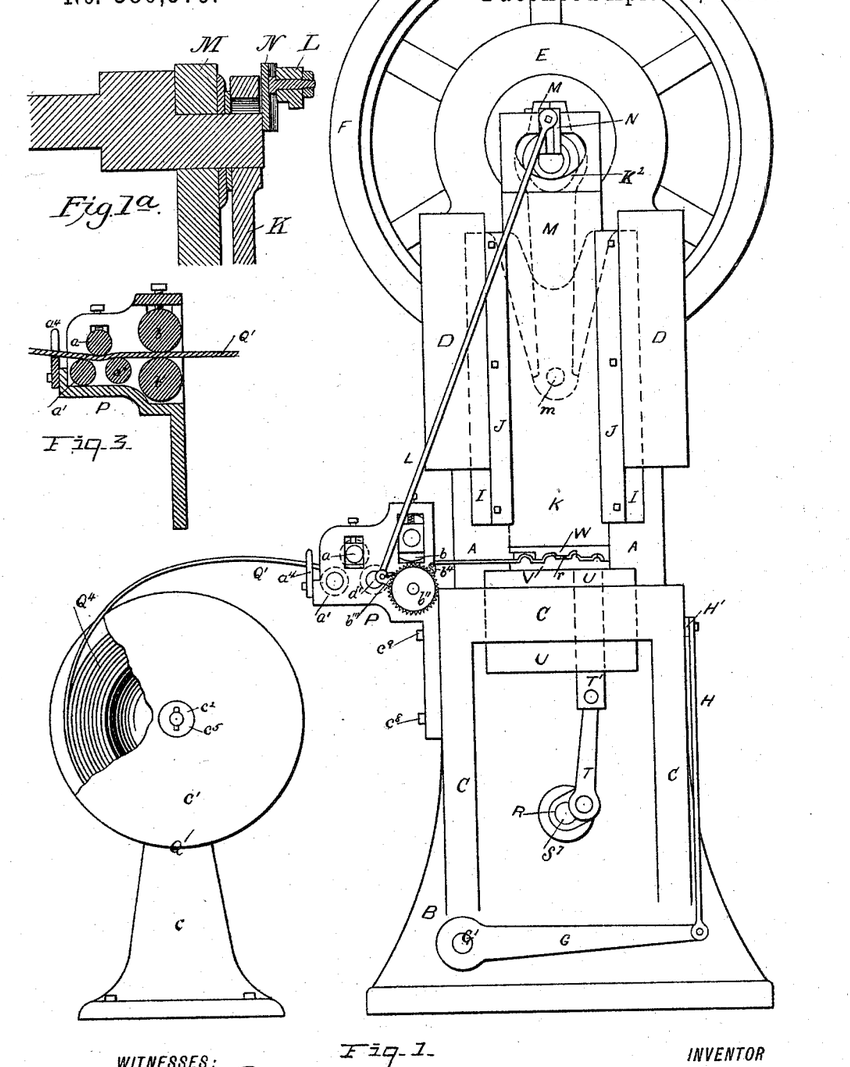
Figure 2:
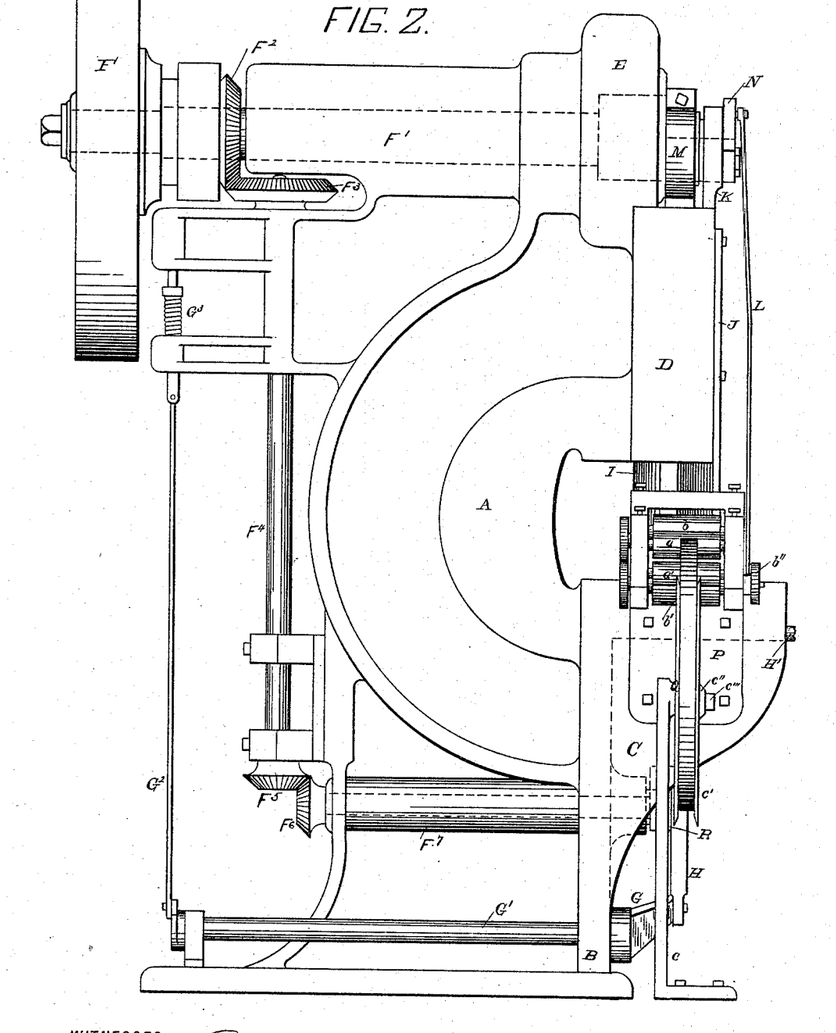
Fig. 2 is a side view.

Referring to Figs. 1 and 2, B represents the bed of a press, which may be of any suitable form of construction. The form herein shown is that of the well-known ungeared press.

A is the upper portion of the frame, provided with an arched portion or recess to allow room for the slides and dies. The frame A has at its upper portion a horizontal limb E, in which is formed a bearing for the main driving or crank shaft $F'$, on which is mounted loosely a pulley F, driven by belt. Between the pulley and shaft is a clutch operated by means of crank G, shaft $G'$, rod $G^2$, and spring $G^3$. The crank G is reciprocated by means of a foot-treadle or the lever $H'$ and connecting-rod H. The clutch and the devices for operating the same are of any well-known form of construction and need not be specifically herein described. They are found on many presses now on market. The shaft $F'$ is provided with a miter-gear $F^2$, meshing with gear $F^3$ on vertical shaft $F^4$, which at its lower end carries a gear $F^5$, meshing with gear $F^6$ on horizontal shaft $F^7$, which has its bearings on lower part of frame. The shaft $F'$ projects beyond the part E and has at its forward end a crank or eccentric pin on which is pivoted a pitman M, which at its lower end is pivoted to a pin $m$ on the slide I. (Shown in section in Figs. 4, 5, 6, and 9.) As the shaft $F'$ revolves it is evident the slide I will be caused to reciprocate vertically beneath the guides or ways D D, which are secured to each side of the frame A or formed integral therewith.

The opposed bearing-surfaces of the guides D D and slides I are held as is usual in this class of machines.

To each side of the slide I is bolted a guide J, beneath which is confined a cam-slide K, which is formed with a cam $K^2$ at its upper end. Through the cam $K^2$ the crank-pin of the shaft $F'$ passes. The crank-pin may be provided with an antifriction-roller where it has its bearings on the surface of the cam. The object of this construction is that the slide K, which is provided with or carries at its lower end the holding-dies and that accompanies the slide I in the first and last part of its movement, may be caused to clamp the link material against the lower dies and hold it firmly clamped while the slide I, to which the punching and forming dies are attached, moves farther down to do its work of punching and forming, and, returning, withdraws the punching and forming members from the material.

The cam $K^2$ is so formed or disposed that the slide K is arrested while the forming and punching dies continue on to do their work, and yet in its journeys to and from its arrested position accompanies the slide I.

The slide K is arrested to hold the metal against the lower dies while the crank-pin is traversing the lower part of the cam $K^2$, which lower part is curved concentrically to the movement of the crank-pin.

The slide K is formed at right angles at its lower end and extends inwardly toward the frame A, where it terminates in the part W, which forms the holding-die and is mortised, as to the die W, to permit the die W', attached to the slide I, to reciprocate in and through it. (See Figs. 4, 5, 6, 7, 11, 12, 13, and 14.) The die W' is provided at its upper end with the square stem $k$, which is secured in the slide I by means of the clamp-plate I', through which pass horizontally the set-screws $i\ i$, taking into threaded holes in the slide I. The slide I is formed with a vertical right-angled or V-shaped opening and the plate I' is provided with an opposed right-angled or V-shaped opening, except that the hypotenuse thereof is somewhat less than that of the opening in slide I, which is isometric with the diagonal of the stem $k$. The stem $k$ may therefore be rigidly held in the slide I by the adjustment of the set-screws $i\ i$. For different-sized links different dies will have to be substituted in the place of W and W'. The link is shown in perspective in Fig. 6 and is there marked Q''. (For a more detailed description reference is hereby made to my patent before mentioned.) In brief, the link consists of the two side bars $p\ p$, the end bar $q$, composed of the two parts $q'$ and $q^2$, the part $q^2$ being rolled up from metal taken from the center or interior material of the link, and the sprocket-bar $q^3$, also formed of two parts $q^4$ and $q^5$, the part $q^5$ being formed or rolled up from the metal from the interior of the link. The parts $q'$ and $q^4$ are of the full width of the link and the parts $q^2$ and $q^5$ are of the width of the central opening of the link. By bearing this in mind the construction and form of the dies and their operation will be more readily understood.

The die W' consists of three members $l, l'$, and $l''$. The member $l$ is formed with two circular recesses $l^2$ and $l^3$ eccentric to each other and adapted to crimp the link material over the rib V' of the stationary die V, which rib is in the form of two segmental circles eccentric to each other and corresponding, respectively, (with their radii the thickness of the link material less) to the two eccentric recesses $l^2$ and $l^3$ of the opposed upper dies. The recess $l^2$ is adapted to form the part $q^4$ and the recess $l^3$ the part $q'$ of the link. The reason of the eccentricity and difference in the radii of the two recesses $l^2$ and $l^3$ will be readily apparent from the fact that they form the body part, respectively, of the end bar and spocket-bar of different links, and that in assembling the links the end bar $q$ has its bearings in the sprocket-bar $q^3$ of another link. The lower stationary die V is formed of four parts 1, 2, 3, and 4. Between 1 and 2 is the opening $c^6$ to provide for the operation of the cutter $c^5$ of $l$, between 2 and 3 is the opening $d'$ to provide for the operation of the crimper $d$, and between 3 and 4 is the opening $e^3$ for the operation of the punching member $e$ of $l''$ and also for the bearing of the lower reciprocating slide T'.

The part $l$ of die W' is provided with a cutter $c^5$, the cutting edge of which passes down close to the outer edge of the opening $c^6$ (by "outer edge" is meant the edge farthest from the finished link) and is designed to shear the link material transversely and quite across what is to be the opening of the link and making the division in the metal in the interior of the link which is to separate the loop or hook parts $q^2$ and $q^5$.

It will be noticed that there is sufficient space between the rib V' and the opening $c^6$ to allow sufficient metal for the formation of the hook part $q^2$. This metal for the formation of the part $q^2$ is initially cut, as to its sides, by the die $d$ and subsequently and completely by the die $e$, hereinafter described.

The part $l'$ of die W' is formed, as to its end $d$, with the cylindrically-curved crimping-faces $d^2$ and $d^3$, that, working, respectively, against the curved shoulders $d^4$ and $d^5$ of the opening $d'$ of the lower die, (see Figs. 4 and 6,) crimp the ends of the lips cut interiorly from the strip to form the hooks $q^2$ and $q^5$, so that they shall have initially and respectively the exact curves of the formed end and sprocket bars. The die $d$ is formed with side cutting edges to shear the metal that is to form the parts $q^2$ and $q^5$.

The part 2 of die V is formed with a rib $V^2$, exactly similar to rib V'.

The die W is formed of four parts 5 6 7 8. The portion 6 is formed with the recesses $l^4$ and $l^5$, exactly similar to recesses $l^2$ and $l^3$, and designed to work down over the rib $V^2$.

Figure 10:
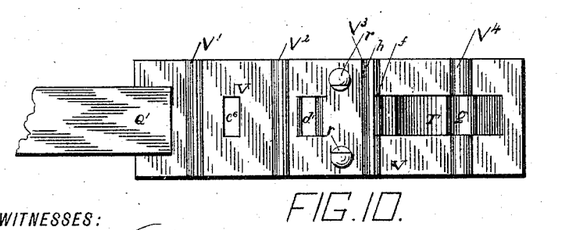
Fig. 10 is a top view of the lower die and plunger.
Figure 11:
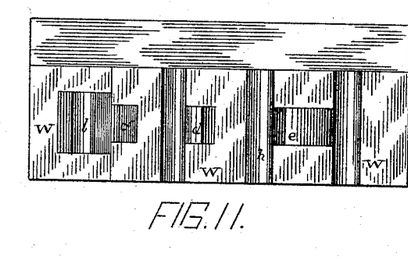
Fig. 11 is a face view of the upper dies.

The part 3 of die V is provided with a rib $V^3$, exactly similar to the curved part $v^2$, and is provided with a vertically-disposed cutting edge, against which the cutting edge $h$ of the part 7 of die W acts to sever the link from the body of the link material transversely and completely. The part 7 of die W is also provided above the knife $h$ with a curved recess $l^6$, exactly like $l^2$, to press the part $q^4$ of the sprocket-bar over the rib $V^3$ on the stationary die V and with a curved recess $l^2$ terminating upwardly in the knife $h'$ to press the part $q'$ of the end bar down on the broken rib $h^2$. The part 8 of die W has a recess $l^8$ of the curve of $l^2$ to press the bar $q^4$ over a rib $V^4$ on the die V. (See Figs. 4, 6, and 10.)

Figure 4:
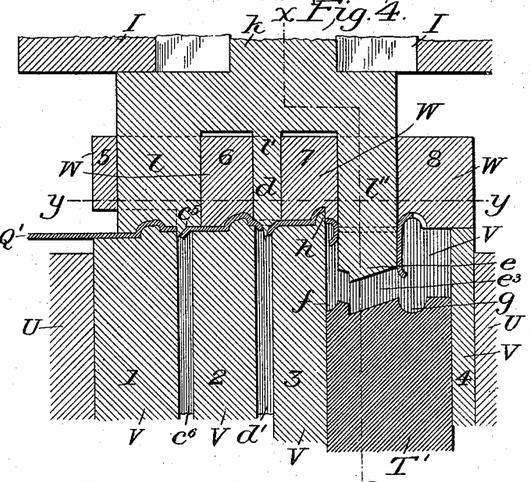
Fig. 4 is a longitudinal vertical section of the dies closed.
Figure 5:
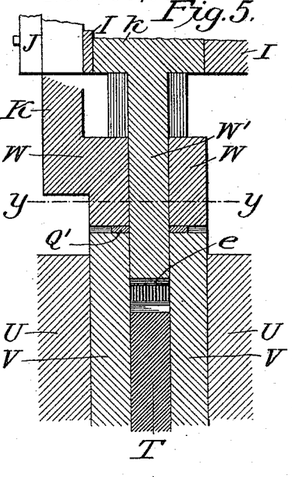
Fig. 5 is a vertical cross-section of the dies on the line $xx$, Fig. 4.

The part $l''$ of die $W'$ is provided with the punching-tool $e$, which is formed with cutting side edges to complete the longitudinal shear of the metal interiorly of the link to form the hook $q^2$ and the hook $q^5$, the former by the cutting edges $e'$ and the latter by the cutting edges $e^2$. (See Figs. 4 and 11.) The punching-die $e$ passes down into the opening $e^3$ between parts 3 and 4 of die V and forces downwardly the metal to form the hooks $q^2$ and $q^5$ ready for the action of the lower reciprocating slide $T'$, as shown in Fig. 4.

Between the parts 3 and 4 of the lower die V reciprocates the lower slide $T'$, operated through the pitman T by the crank R on the shaft $F^7$, that has its bearings in the frame. (See Figs. 1 and 2.) The slide $T'$ is formed into a die at its upper end designed to roll up the lower or hook parts $q^2$ and $q^5$ of the link. The slide is cut away centrally at its upper end to fit the punching-die $e$, and the shafts $F'$ and $F^7$ are so timed that the die $e$ and slide $T'$ meet and move up together. The slide $T'$ has at its upper end the two circular recesses $f$ and $g$, the former of which corresponds to the outer circular contour of hook $q^2$ and the latter to that of $q^5$.

The recesses $f$ and $g$ register with corresponding recesses in the parts 7 and 8 of die W, and as the slide $T'$ moves up against die W the punching-die $e$ also rises, and the metal cut out from the interior by the latter follows the contour of the curved recesses $f$ and $g$ and is thereby rolled up into the hooks $q^2$ and $q^5$, that form with the curved body parts $q'$ and $q^4$, respectively, the circular end bar and the circular sprocket-bar of the link.

The die V is securely held in the holding chuck or block U, that is seated in part C of frame B. This block or chuck may be provided with set-screws or adjustable jaws or made in any other well-known way to clamp the die V.

Figure 6:
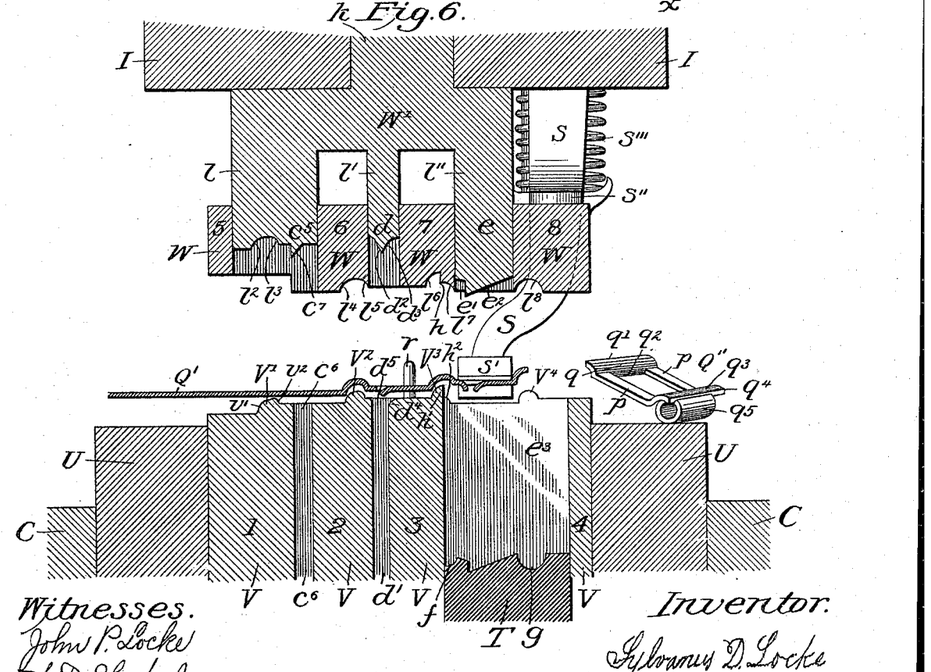
Fig. 6 is a longitudinal vertical section of the dies open and with the link material presented by the feeding devices for a new stroke and showing the link-discharging devices in the rear.
Figure 7:
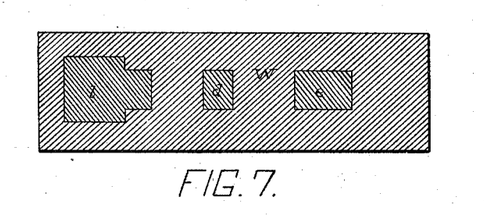
Fig. 7 is a horizontal section of the upper dies on the line $yy$, Figs. 4 and 5.
Figure 8:
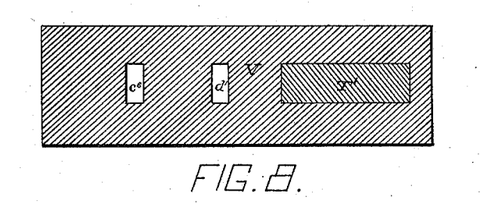
Fig. 8 is a horizontal section of the lower die and plunger.
Figure 9:
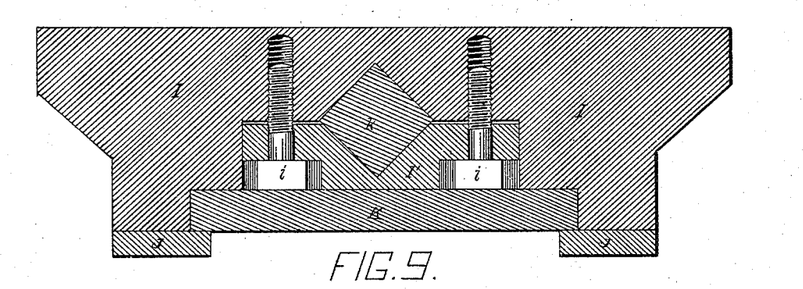
Fig. 9 is a horizontal section of the lower portion of the slide.
Figures 12, 15, 16:
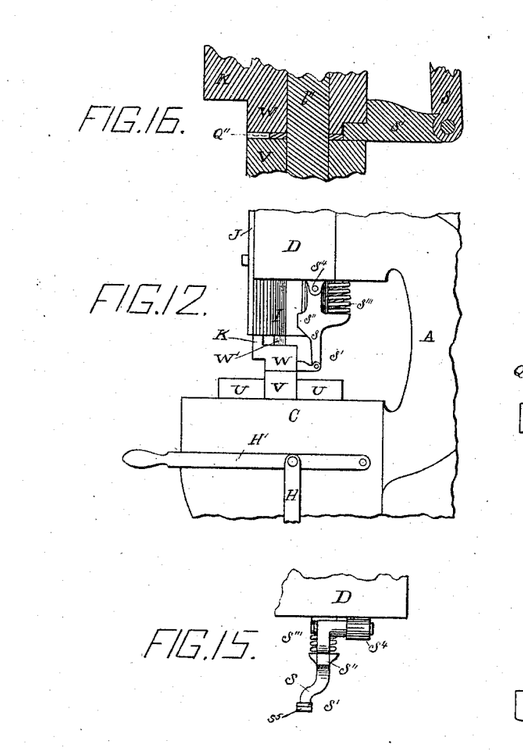
Fig. 12 is a side view opposed to Fig. 2, showing the link-discharger.
Fig. 15 is a front view of the link-discharging devices.
Fig. 16 is a longitudinal vertical section of dies closed and of discharging device.
Figure 13:
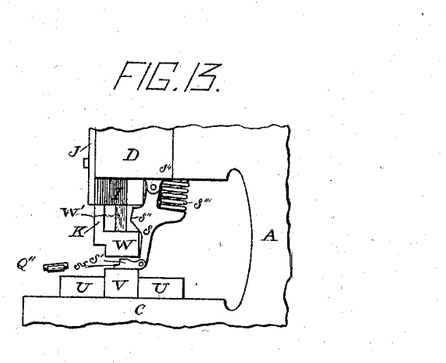
Fig. 13 is a side view of same, showing the link being discharged as the dies separate.
Figure 14:
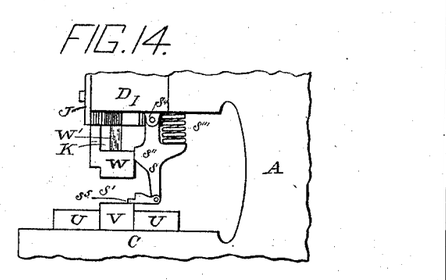
Fig. 14 is a side view showing discharger retracted and dies fully separated.

The finished link is removed or discharged from the machine by the following devices, (illustrated in Figs. 6, 12, 13, 14, and 15:) Pivoted to the brackets $s^4$, so as to swing freely forward and back, is the discharge-arm S, pressed to swing normally forward by the spring $S'''$. This arm is provided with a cam-face $S''$, against which the die W as it rises acts to swing the arm back, as shown in Fig. 14. To the lower end of this discharge-arm is pivoted the discharger $S'$, that rests as to its forward or discharge end when the arm is swung back on the top of the lower die V but near its edge and out of the way of the forming-link driven in by the feed mechanism, as shown in Figs. 6 and 14. The spring $S''$ forces the discharger forward to discharge the link, as shown in Fig. 13. On the top of the discharger and a short distance from its end is shown a vertically-raised shoulder. As the die W descends and runs off of the cam-face $S''$ the discharger is pressed forward until its end strikes the side of the forming-link that, being unsevered from the ribbon of material, holds the discharger from further movement until the link having been completed and severed and the die rising allows it to act. As the die W descends it rests with the shoulder of the discharger against its side face, as shown in Fig. 12. The purpose of the shoulder is to delay the action of the discharger and the latter is thereby prevented from acting until the die W, together with $W'$, is sufficiently removed from the lower dies, so that the link may be easily and surely driven out by the discharger.

The operation of this discharging mechanism is as follows: When the parts are as represented in Fig. 14 and the feed mechanism (to be hereinafter described) has moved the strip or ribbon of link material and the partly-formed links forward one step, as shown in Fig. 6, the die W descends. At the first part of its downward movement it runs off of the cam-face $S''$, so releasing the discharger that presses slightly forward until its end strikes the rear edge of the forming-link, as shown in Fig. 6. Continuing its descent the die W runs down in front of the shoulder of the discharger, as shown in Figs. 12 and 16. When the die W rises, it first runs off of this shoulder to allow the discharger to act to eject the completed link, as shown in Fig. 13, and then runs against the cam-face $S''$ and drives back the discharger to its first position. (Shown in Fig. 14.) To prevent die W by frictional contact from lifting the discharger, the latter is stop-shouldered with the discharge-arm S. In order to render the operation of the discharger more certain, the stroke of the slide $T'$ may be adjusted to lift the link out of its seat in the opening $e^3$ of the die V. Two guide-pins $r$ $r$ are secured in the lower die, one on either side, to guide centrally and to preserve the proper position of the link material for the operation of the dies.

It is apparent after the machine is once filled, as shown in Figs. 4 and 6, that a link is finished and discharged at each revolution of the driving-shaft $F'$ or stroke of the upper dies.

The die W is principally a holding-die and its principal function is to firmly hold the link material while the die $W'$ and slide $T'$ are performing their work; but this die W has also a cutting function. By it, as shown in Fig. 4, the link is severed or cut off from the ribbon or strip of link material.

The operation of the dies is, in brief, as follows: The link material $Q'$ is fed in between the dies until the end is, say, coincident with the line of demarcation between the segments $v'$ and $v^2$ of rib $V'$. The part 1 of die W' then forces the metal down against the lower die, crimps it, and forms the part $q^4$ of the link. The material Q' is then automatically fed along until part $q^4$ abuts similarly against the rib $V^2$, (as it first did against V',) when, the upper dies descending the second time on part 2 of die V, 1 crimps the metal and forms the part $q^4$ for the succeeding or second link, at the same time forming the part $q'$ of the first link, while $c^5$ cuts the metal transversely and longitudinally in the interior of the first link. The bar is then automatically fed along until the end or part $q^4$ abuts similarly against rib $V^3$ on part 3 of die V, when, the dies descending the third time, $d$ imparts the initial curves to the metal to form parts $q^2$ and $q^5$ of the first link, and 1 forms the part $q^4$ of third link and $q'$ of second link, while $c^5$ cuts the metal transversely and interiorly of the second link. The link material is then moved along until the end or part $q^4$ abuts similarly against the rib $V^4$ on part 4 of die V, the side bar of first link abutting against shoulder $S^5$ of link-displacer S', when, the dies descending the fourth time, knife $h$ on clamping-die W acting, first severs or cuts off the first link, and then the die W' continuing repeats, respectively, on second, third, and fourth links the described action on first, second, and third links, while the punching member $l''$ punches out interiorly from the first link, as shown in Fig. 4, the central lips that are to form the hooks $q^2$ and $q^5$. When the punch $l''$ goes up, the slide T' also ascends and the hook $q^5$ is formed in the recess $g$ and in the opposing recess in die W, and the bar $q^2$ is formed in recess $f$, and as the die W rises the link-displacer ejects the link, as before described.

In the previous description four full strokes of the upper dies or four revolutions of shaft F' are necessary to produce a complete link, but such description commences at the beginning of the operation of the machine, and it is evident, as before noted, that the machine after the first three strokes turns out a completed link at each stroke of the dies. In starting the machine the link-displacer should be removed or held back until the first link is fed along far enough to be operated upon by the die $l''$.

Bolted to the frame C at $c^8 c^9$ is the feeding device P, in which are mounted the straightening-rollers $a$ $a'$ $a''$. The roller $a$ is mounted in a box-bearing adjustable up and down in a slot in frame P and is intermediate but above the rollers $a'$ $a''$. The chain is made from a continuous ribbon of metal, preferably wound in a roll or in a coil, and the object of the rollers $a$, $a'$, and $a''$ is to straighten the metal as it comes from the coil. The roller $a$ to straighten should press the material down somewhat below the top of $a'$ $a''$. The box in which $a$ is mounted is adjustable by means of a set-screw, as is also one of the feed-rollers $b$, mounted above the feed-roller $b'$. Between $b$ and $b'$ the ribbon Q' is led. A crank N is mounted on the eccentric crank-pin of the shaft F'. The crank N is provided with an adjustable pin on which is mounted, pivotally, the bar L.

The lower end of bar L is provided with a crank $b'''$, mounted pivotally on shaft of roller $b$, and the crank is provided with a detent-spring actuated and pivoted to the crank, which detent drives the gear-wheel $b''$, secured to spindle or axis of roller $b'$. The wheel $b''$ is also provided with a detent $b^4$ to prevent backward play of the roller $b'$ or the displacement of the ribbon after it has once been moved ahead. The pin in crank N is adjustable to regulate the throw of bar S, and consequently the feed of the ribbon. The ribbon-coil $Q^4$ is mounted on a reel Q on a stud $c^5$, secured in frame $c$. The shield $c'$ is secured on the stud by a pin $c^2$, and prevents, together with shield Q', the displacement of the coil of ribbon. The operation of this part of the invention is too apparent to need further description.

I prefer to use a ribbon or strip of low-grade steel of the exact width of the completed link, although other sheet metal and of other and different widths may illustrate several parts of my invention equally well. I prefer to use the ribbon of steel from annular coils carried on reels, on which they freely turn to pay off in use. From the reel the ribbon runs through a straightening device to take out the circular bend it has in coil. I prefer to use to straighten the ribbon three rolls disposed as shown in drawings, although any effective number or disposition of the rolls may be employed. Hardened steel bars might be used in place of the rolls with some loss of power. The feed mechanism preferably consists of a single pair of rollers geared together and diametrically adjustable to thickness of ribbon; but the number and their being geared together is not necessary to a full illustration of my invention. The ribbon in passing through machine must be centrally guided. I prefer to use for this purpose a guide at two points. The first, just before the straightening device is reached, is shown at $a^4$ in Figs. 1 and 3. The second guide (shown more particularly in Figs. 6 and 10) consists of stops $r$ on each side of the forming-link ribbon, preferably on member 3 of die V.

It may be said that the mechanism of the dies, including the link-discharger that is operated by one of the dies, consists of seven distinct parts that complete and discharge the link in seven different steps. The first part of this mechanism consists of the recesses $l^2$ and $l^3$, working against rib V' to transversely bend the ribbon to form the upper parts $q'$ and $q^4$ of the end and sprocket bars. The second part consists of the cutter $c^5$ and opening $c^6$, with cutting edge to transversely cut the interior section of the link to sever the material that is to make the hook parts $q^2$ and $q^5$ of the link. The third part consists of the crimping member $d$, working with the curved mouth of the opening $d'$ to give to ends of the severed interior sections the curves conforming, respectively, to that of the end and sprocket bars. The fourth part consists of the movable knife $h$ and stationary knife $h'$, working together to cut off the partly-formed link from the strip $Q'$ of link material. The fifth part consists of the punching member $e$ of $l''$, that, working in opening $e'$, cuts out the central lips (shown in Fig. 4) that are to make the hooks $q^2$ and $q^5$ of the link. The sixth part consists of the die $T'$ and other parts by which the lips cut out by the fourth part are rolled up into the hoops $q^2$ and $q^5$ of the end and sprocket bars, and the seventh part consists of the mechanism by which the links as made are timely discharged. The disposition of these parts and their action on the material is preferably in the order named, although this is not essential, as to all the parts, to perfect work. For instance, the transverse interior cutting parts may be disposed before or act before the parts by which the transverse bending of the ribbon is secured.

It is evident that only the mouth of the opening $c^6$, with its cutting edge $c^7$, and the mouth of $d'$, with its rounded shoulders, are essential to the operation of the cutter $c^5$ and crimper $d$, but for ease of making their mouths of the proper formation and to prevent their being filled with the accumulation of iron scales and other foreign matter these openings are preferably carried quite through the die V, as shown in the drawings.

It is evident that the punch member $l''$ should have its end inclines $e'$ and $e^2$ quite flat, perhaps more so than shown, so that the lips (that are to form the hook parts of the link) cut out and carried down by them shall not be unduly rolled out, but shall hang, except as to their curved ends, perpendicularly down, as shown in Fig. 4. It is also evident that the rib V' and the corresponding recess in $l$ do not form the parts $q'$ and $q^4$ of the same link, but of two links. The part $v'$ of the rib forms $q'$ of the end bar of one link, and $v^2$ forms $q^4$ of the sprocket-bar of the adjacent link.

By reference to Fig. 4 it will be seen that the punch member $l''$ may aid the reciprocating die $T'$ in rolling up the hook parts $q^2$ and $q^5$ of the link. With their motion so adjusted that the die shall follow closely the punch member as it rises the latter serves the auxiliary purpose of preventing the depending lips from doubling back under the action of the die in rolling them up.

In the drawings, Figs. 1, 2, 3, 12, 13, 14, and 15 are one-eighth size or one-eighth of full size, and Figs. 4, 5, 6, 7, 8, 9, 10, 11, and 16 are one-half size.

I do not limit my invention to the precise form, arrangement, and disposition of the several parts as herein shown. Many modifications thereof may be made without passing beyond the limit of the invention. The construction and manner of operating any of the several parts of the machine may be varied without excluding the just construction of my claim or effecting the operation of the machine as a whole. This is particularly true of the dies for fashioning the link and the discharging mechanism that ejects it. The terms "upper" and "lower" are herein used only relatively, and it is evident that "stationary" and "movable" or "reciprocating" may be transposed. The straightening device or mechanism may be arranged after instead of before the feed mechanism, but because the ribbon or strip of material would then be pushed instead of pulled through the straightening device by the feed mechanism I prefer to make the straightening device intermediate of the reel on which the coil or roll of ribbon is carried and the feed mechanism. Neither is my invention limited to the form or kind of machine, an ordinary power-press, by which it is herein illustrated, and I do not desire to limit it in its broadest features to any style or form of machine. Neither do I limit my invention to two lips to be severed, initially bent, and rolled up into the hook parts of the end and sprocket bars. It is evident that one of the bars, as the end bar, need not have a hook part and that only one lip need be severed, initially bent, and rolled up. My invention includes the singular "lip" as well as the plural "lips" and these terms are interchangeable, the use of the plural form including the singular.

Having described my invention, what I claim is—

1. In a machine for making chain-links from a continuous strip of sheet metal, a main frame, a driving-shaft thereon, an eccentric on the driving-shaft, ways secured to the frame, a slide reciprocating in the ways and carrying the forming-die having a plurality of members, ways on the slide and a second slide held in place by the ways and provided with the holding-die also having a plurality of members between which the members of the forming-die reciprocate, as and for the purpose specified.

2. In a machine for making chain-links from sheet metal, a reciprocating clamping-die driven by a crank working in an orbital cam-slot, and a reciprocating forming-die auxiliary thereto and driven by an eccentric and working with the clamping-die, whereby the dies are driven down substantially together until the sheet metal is reached when the concentric portion of the cam-slot arrests and holds the clamping-die in clamping position on the sheet while the forming-die continues on to form the sheet into links and returns to accompany the clamping-die on its upward stroke, substantially as and for the purpose set forth.

3. In a machine for making chain-links from sheet metal, a driving-shaft having an eccentric and a crank mounted thereon, a slide carrying the punching and forming dies and driven up and down by the eccentric, and a second slide, carrying the clamping-die and having an orbital cam-slot mounted thereon, driven by the crank, whereby the forming-die is given a regular up-and-down crank stroke and the clamping-die accompanies it in the first and last parts of its stroke and is arrested momentarily at mid-stroke, substantially as and for the purpose set forth.

4. In a machine for making chain-links from sheet metal, a reciprocating slide driven by a crank working in an orbital cam-slot thereon, and a reciprocating die attached to the slide having a plurality of members with a series of dental spaces or apertures passing vertically therethrough, combined with a second slide driven by an eccentric and carrying a second reciprocating die having a series of dental members working in and through the apertures of the first die, substantially as and for the purpose set forth.

5. In a machine for making chain-links from sheet metal, a driving-shaft having an eccentric thereon, a slide carrying a die and driven by said eccentric, a crank on said shaft, and a second slide provided with a cam-slot having its lower portion concentric with the drive-shaft and engaging with the crank, whereby the slides are moved together during a portion of their travel and the second slide is held stationary during the latter part of the downward stroke of the first, as and for the purpose set forth.

6. In a machine for making chain-links from sheet metal, a lower stationary forming-die having a transverse rib formed of two parts curved eccentrically and from different centers and radii, and an upper movable die having a transverse recess formed of two parts curved eccentrically and from different centers and radii to conform with the rib on the lower die, and working therewith to form the upper unsevered portions of the end bar of one link and the sprocket-bar of an adjacent link, whereby the first step in the making of a link is accomplished, substantially as described.

7. In a machine for making chain-links from sheet metal, a stationary lower die having a transverse cutting-rib curved to conform to the interior of the upper part of the sprocket-bar, and a movable upper die having a transverse recessed cutting member curved to conform to the exterior of the upper part of the end bar and working with the cutting-rib on the lower die to cut off the partially-formed link from the strip of link material, whereby the fourth step in making a link is accomplished, substantially as described.

8. In a machine for making chain-links from sheet metal, a stationary lower die transversely ribbed as to its sides to conform to the interior curves of the upper parts of the end and sprocket bars, a movable upper clamping-die transversely recessed to conform to the exterior curves of the end and sprocket bars, to hold the partly-formed link on the lower die, and a movable lower die transversely recessed to conform to the completed end and sprocket bars, and adapted on its upper stroke to roll up the central lips into the hook parts of the end and sprocket bars, whereby the sixth step in making a link is accomplished, substantially as described.

9. In a machine for making chain-links from strip or sheet metal, a lower stationary die provided with a transverse cutting edge, a vertical opening with rounded shoulders, and a transverse cutting-rib, an upper movable forming-die having a transverse cutter working with the cutting edge to sever the lips, a transverse forming member working with the vertical opening to initially bend the lips, and a second movable upper die having a transverse recessed cutting member working with the cutting-rib to sever the initially-formed link from the strip, as and for the purpose set forth.

10. In a machine for making chain-links from strip or sheet metal, a lower stationary die provided with a transverse cutting-rib, and a central rectangular opening having sides to support the side bars of the forming-links, in combination with an upper reciprocating clamping-die to clamp the side bars thereon, and having a transverse cutter working with the transverse rib, and an upper reciprocating forming-die having a rectangular punching member working with the rectangular opening of the lower die to sever and punch out the lips for the end and sprocket bars, as and for the purpose set forth.

11. In a machine for making chain-links from sheet metal, an upper reciprocating die provided with transverse semicylindrical sockets, combined with a lower reciprocating forming-die also provided with transverse semicylindrical sockets, working against the upper die, whereby the lips are rolled up and formed into the end and sprocket bars, substantially as and for the purpose set forth.

12. In a machine for making chain-links from sheet metal, an upper reciprocating clamping-die provided with semicylindrical transverse sockets, an upper punching-die auxiliary thereto, to punch out from the interior of the links the lips for its opposite end and sprocket bars and a lower stationary die, combined with a lower reciprocating forming-die working with the clamping-die to roll up the lips into the sockets and form them into the hook parts of the end sprocket-bars, whereby the links are completely formed as and for the purpose set forth.

13. In a machine for making chain-links from sheet metal, a lower stationary die having a plurality of members with formed vertical openings or apertures therein and working simultaneously on different links, an upper holding-die to clamp the links each on a member of the lower die, and an upper forming-die having a plurality of members acting with the members of the lower die to transversely and simultaneously act on different links and sever, initially bend, and punch out the lips from the interior of the links, to form the hook parts of the end and sprocket bars, substantially as set forth.

14. In a machine for making chain-links from sheet metal, an upper reciprocating holding-die provided with recesses coöperating with ribs on a lower stationary die to form the upper parts of end bars of the links, an upper punching-die reciprocating within the holding-die, and through openings in the lower stationary die, to cut out the lips from the interior of the strip to form the lower parts of the end bars of the link, and a reciprocating lower die to complete the formation of the end bars, as specified.

15. In a machine for making chain-links from strips of sheet metal, a lower stationary die, an upper coöperating clamping-die, adapted to form the upper parts of the end bars, and to sever the link from the strip, a cutting-die reciprocating within the clamping-die adapted to punch out from the strip metal for the lower parts of the end bars of the link and a lower reciprocating die provided with recesses for the completion of the formation of the end bars, substantially as and for the purpose specified.

16. In a machine for making chain-links from a continuous strip of sheet metal, a lower stationary die provided with ribs to form the opposite end bars, and openings with curved shoulders, an upper clamping-die, and an upper punching-die to form the strip over the ribs, punch out the metal from the interior of the strip, for the lower parts of the end bars, and give the initial bend thereto, and a lower reciprocating die to form up the lips punched out into hooks, as specified.

17. In a machine for making chain-links from sheet metal, a reciprocating holding-die, a second forming-die reciprocating with the holding-die, and provided with three members to successively cut, crimp and punch the material in forming a link, as the material is fed into the machine, a cutting edge on the holding-die to sever the link, a lower stationary die, and a lower reciprocating die to complete the link, whereby the link is completed, substantially as specified.

18. In a machine for making chain-links from sheet metal, an upper forming-die and an upper holding-die, one moving within the other, each composed of three members, the first two members of the forming-die being adapted to partially form the link from the unsevered material, a member of the holding-die to sever the link from the strip, adjacent to the third member of the forming-die, a reciprocating lower die to act with the latter to complete the link, and a stationary lower die to act with the first two forming and punching members, substantially as and for the purpose specified.

19. In a machine for making chain-links from a continuous strip of sheet metal, a driving-shaft, a plurality of dies operated thereby to partially form the link from the unsevered material, a cutting-die to sever the partially-formed link, and a lower reciprocating forming-die working upward to complete the formation of the link, whereby a link is completed at each revolution of the driving-shaft, substantially as specified.

20. In a machine for making chain-links from a continuous strip of sheet metal, a driving-shaft, a plurality of dies operated thereby to partially form the link from the unsevered material, a cutting-die to sever the partially-formed link, a lower reciprocating die moving upward to complete the link, and link-discharging mechanism operated by one of the dies, whereby a complete link is formed and discharged from the machine at each revolution of the driving-shaft, substantially as described.

21. In a machine for automatically making drive-chain links from a ribbon of sheet metal, reciprocating punching, forming and cutting dies, adapted to crimp the end bars, punch out the lips for the lower part of the end bars from the interior of the strip, and roll up the lips so punched out into the end bars, and an automatic feeding mechanism to feed the strip to the dies, as specified.

22. In a machine for making chain-links from a ribbon or strip of sheet metal, upper and lower dies, by which the hook parts of the end and sprocket bars are formed of material cut and rolled up from the center of the link, and having curved recesses and curved ribs by which and on which the upper portions of the end and sprocket bars are formed and the link completed, and automatic feeding mechanism feeding the ribbon thereto, substantially as specified.

23. In a machine for making chain-links from a ribbon or strip of sheet metal, in which a link is completed at each revolution of the driving-shaft, a driving-shaft, an eccentric thereon, a plurality of dies operated thereby to partly form the link on the ribbon, to sever the partially-formed link and then to complete the link, combined with an automatic feeding mechanism to feed the ribbon into the dies, substantially as specified.

24. In a machine for making chain-links from a continuous strip of sheet metal, a driving-shaft, a reciprocating clamping and crimping die, a reciprocating die to punch out the material from the interior of the strip to form the lips, and a reciprocating die to form the lips into hooks, a straightening device, and an automatic feeding mechanism to pull the strip through the straightening device, as and for the purpose specified.

25. In a machine for making chain-links from a continuous strip of sheet metal, a driving-shaft, a plurality of dies operated thereby to partially form in the strip a series of steps to complete a link, straightening-rolls to straighten the strip, and feeding-rolls intermediate the straightening-rolls and the dies to feed the strip into the dies, as specified.

26. In a machine for making chain-links from a coil of steel ribbon, the combination with the dies to crimp the end bars, punches to punch out lips from the interior of the strip and a forming-die to roll up the lips into hooks, an auxiliary reel for holding a coil of the link material, feeding mechanism, and a straightening device intermediate the reel and feeding mechanism, as specified.

27. The combination in a machine for making chain-links from a strip of sheet metal, of a plurality of dies by which all the steps to produce a link are taken simultaneously and progressively on adjacent link-sections of the strip, of feeding mechanism stepping in the strip to the dies and an intermittent discharging mechanism to discharge the completed links, substantially as set forth.

28. In a machine for making chain-links from a strip of sheet metal, a reel auxiliary thereto bearing a coil or roll of the link material, straightening mechanism to straighten the strip coming from the coil, feed mechanism urging the strip through the straightening mechanism, link forming and severing dies into which the strip is fed, and link-discharging mechanism operated by the dies, substantially as specified.

29. In a machine for making chain-links from sheet metal, a slide I reciprocating in ways on the main frame and bearing at its lower end the forming-die W', and the cam-slide K reciprocating in ways on the slide I and bearing at its lower end the holding-die W, the forming-die having its members $l$, $l'$ and $l''$ separately sleeved in and reciprocating through the die W, substantially as and for the purpose described.

30. In a machine for making chain-links from a strip of sheet metal, the combination with the lower stationary die, the reciprocating forming-die W' having a member, $l$, seated in and reciprocating through the reciprocating holding-die W, the member $l$ having the transverse recess $l^2$ and $l^3$ working in and with the transverse rib V' on the stationary holding-die V, and having the transverse cutter $c^5$ working in and with the opening $c^6$ and its cutting edge $c^7$, whereby at a single stroke of the dies W and W', a transverse interior cutting is made and the upper portion of the end bar formed on one link and the upper portion of the sprocket-bar formed on a second link, substantially as described.

31. In a machine for making chain-links from a strip of sheet metal, the combination with the lower stationary die, the reciprocating forming-die W' having the member $l$ with its recess and cutter seated in and reciprocating through the holding-die W and working with the rib V' and opening $c^6$ of the stationary die V, and having the member $l'$ with its crimping end, $d$, also seated in and reciprocating through the holding-die W and working with the opening $d'$ of the stationary die V, whereby at a single stroke of the dies W and W', and with reference to one link, the upper portion of the sprocket-bar is formed; with reference to a second link, the upper portion of the end bar is formed and a transverse interior cutting is made, and, with reference to a third link, the ends of the central lips are crimped or initially bent, substantially as described.

32. In a machine for making chain-links from a strip of sheet metal, the combination with the lower stationary die, the stationary die V having its rib V' and openings $c^6$ and $d'$, the forming-die W' having members $l$ and $l'$ seated in and reciprocating through the reciprocating holding-die W having the transverse cutter $h$ working with the cutting edge $h'$ on the stationary die V, whereby at a single stroke of the dies W and W', the first link is cut off from the strip, the second link has the ends of its central lips crimped or initially bent, the third link has the upper portion of its end bar formed and a transverse interior cutting made, and the fourth link has the upper portion of its sprocket-bar formed, substantially as described.

33. In a machine for making chain-links from a strip of sheet metal, the combination with the stationary die V having its rib V', openings $c^6$, $d'$ and $e^3$ and cutting edge $h'$, the reciprocating holding-die W having its cutter $h$, and the forming-die W' having members $l$, $l'$ and $l''$ seated in and reciprocating through the holding-die W, whereby at a single stroke of the dies W and W', the first link is cut off from the strip and punched to cut out its central lips and form its central opening; the second link has the ends of its central lips crimped or initially bent; the third link has the upper portion of its end bar formed and a transverse interior cutting made, and the fourth link has the upper portion of its sprocket-bar formed, substantially as described.

34. In a machine for making chain-links from a strip of sheet metal, the combination with the stationary die V having its rib V' and openings $c^6$, $d'$ and $e^3$, the reciprocating die T' reciprocating in the opening $e^3$ of the stationary die, the reciprocating holding-die W having its cutter $h$, and the forming-die W' having members $l$, $l'$ and $l''$ seated in and reciprocating through the holding-die W, whereby at a single stroke of the dies W and W', the first link is cut off from the strip punched to cut out its central lips and form its central opening, and has its central lips rolled up to make the hook parts of its end and sprocket bars, thereby completing the first link; the second link has the ends of its central lips crimped or initially bent; the third link has the upper portion of its end bar formed and a transverse interior cutting made, and the fourth link has the upper portion of its sprocket-bar formed, substantially as described.

35. In a machine for making chain-links from sheet metal, the discharge-arm S having at its end the discharger S' and operated by the spring S''' and the reciprocating die W, said discharger held in place by the unsevered link until the die W severs the link, substantially as and for the purpose described.

SYLVANUS D. LOCKE.

Witnesses:
FRANK A. BOVIE,
GEO. B. DAY.